United States Patent [19]

Akesson

[11] 4,448,793
[45] May 15, 1984

[54] PROCESS FOR PRODUCING ELONGATED ROD-SHAPED COMMINUTED MEAT PRODUCT

[75] Inventor: Yngve R. Akesson, Helsingborg, Sweden

[73] Assignee: Societe d'Assistance Technique pour Produits Nestle S.A., Lausanne, Switzerland

[21] Appl. No.: 371,307

[22] Filed: Apr. 23, 1982

[30] Foreign Application Priority Data

Sep. 23, 1981 [SE] Sweden ............................. 8105623

[51] Int. Cl.³ .................. A23L 3/18; A22C 11/00; A23P 1/00
[52] U.S. Cl. .................................... 426/241; 99/384; 99/427; 99/441; 426/513; 426/517
[58] Field of Search ............... 426/513, 517, 243, 241; 99/384, 427, 441; 17/34, 32

[56] References Cited

U.S. PATENT DOCUMENTS 3,421,434 1/1969 Krachmer .......................... 426/513

Primary Examiner—George Yeung
Attorney, Agent, or Firm—Vogt & O'Donnell

[57] ABSTRACT

A process for the continuous production of an elongate rod-shaped comminuted meat product which comprises feeding a flowable protein-containing food mixture into a hollow mould which travels through a microwave oven and which is formed by the co-operation of the adjacent runs of a pair of endless flexible belts which have a sealing system and afterwards releasing the meat product from the hollow mould characterized in that the sealing system comprises, on each side of the hollow mould, at least one longitudinal projection on one belt engaging with at least one corresponding recess on the other belt.

12 Claims, 6 Drawing Figures

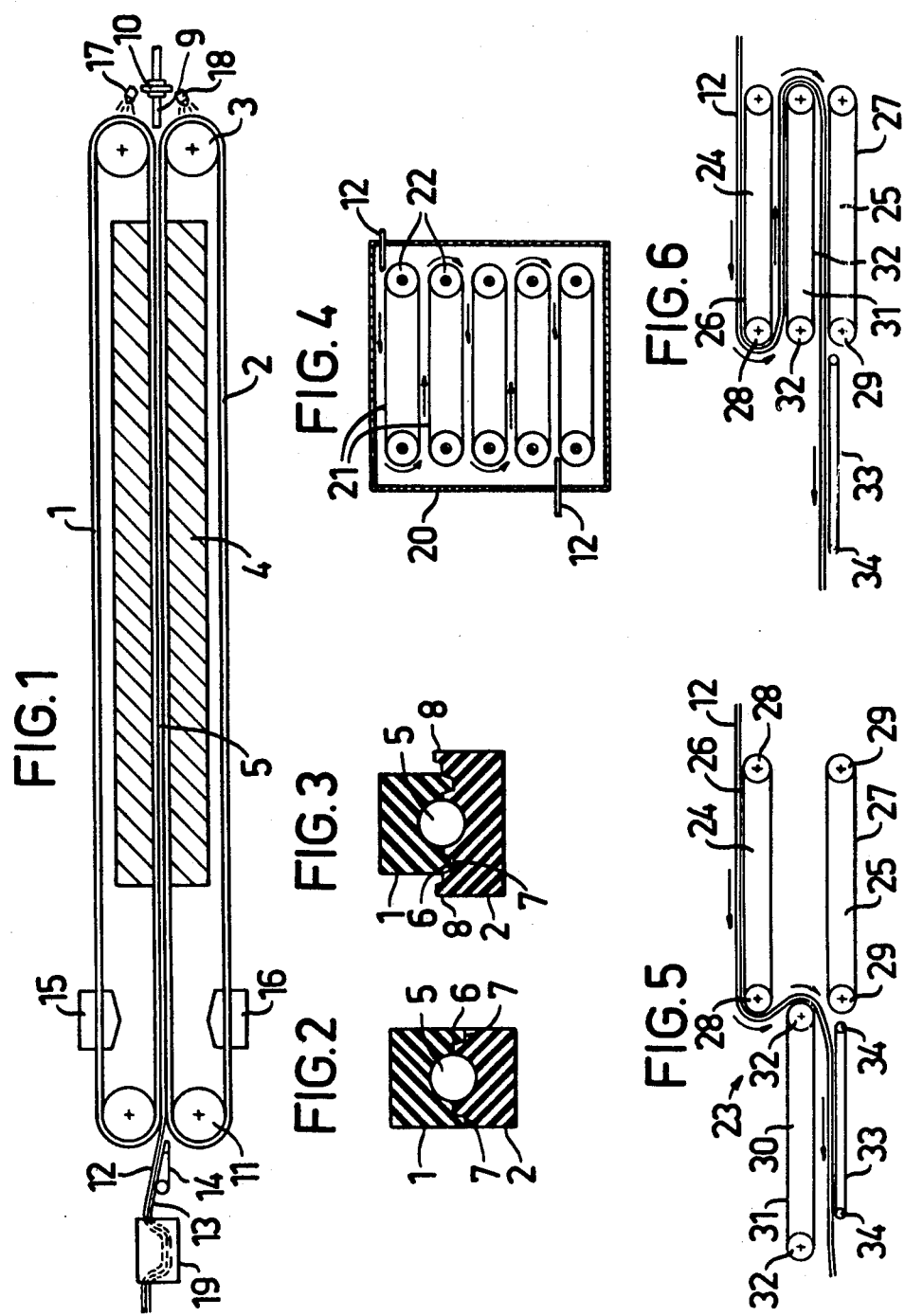

PROCESS FOR PRODUCING ELONGATED ROD-SHAPED COMMINUTED MEAT PRODUCT

The present invention relates to the continuous production of an elongate rod-shaped comminuted meat product, such as a skinless sausage.

At the present time, skinless Vienna sausages are made by coagulating and moulding sausage meat within a skin and afterwards removing the skin which is then discarded, Not only is the use of the skin uneconomic, but the process of removing the skin by incision leaves a scar along the longitudinal surface of the sausage.

In the production of frankfurters, the ends must be moulded to impart the characteristic rounded shape. In one known process for making frankfurters, a sausage mince emulsion is pumped through a long heated stationary tube which emulsion is discretely segmented by means of plugs which travel with it to maintain the ends of the segments spaced apart while imparting the characteristic rounded shape to the ends of the frankfurters. However, the disadvantage of this method is the high resistance of the long distance of travel and the high pressure required, which has an adverse effect on the texture of the frankfurter.

It has been proposed to manufacture skinless sausages by a continuous process which comprises using a pair of endless belts having closely adjacent runs driven in the same direction, which co-operate to form a continuous hollow cylindrical mould having a sealing system which forms where the belts co-operate and which prevents undue leakages. The sausage meat is fed into the cylindrical mould and travels with the mould through a heating zone for instance, microwave oven where it is at least partially cooked, coagulated and moulded to produce a sausage strand which, after leaving the heating zone, is cut into separate sausages. However, the use of this process has not proved to be commercially successful because the various sealing systems heretofore described for the cylindrical mould formed when the belts co-operate, are unsatisfactory. This is because where the belts co-operate their edges overlap so that there are protrusions along the length of the interior of the cylindrical mould, which cause irregularities on the surface of the sausages, giving them an unacceptable appearance. A sealing system is, however, necessary to prevent undue leakage of sausage meat.

We have developed an improved sealing system for a hollow mould formed in a similar manner to that described above, by means of which the cavity wall of the mould is free of surface irregularities, while at the same time excess air and vapour can escape from the cavity so that the production of sausages with a very smooth surface can be achieved.

In this invention, "sealing" does not necessarily mean that no food material can escape from the mould. It should be understood that if the mould is overloaded with protein food mixture, the excess can escape in addition to any excess air and vapour.

Accordingly, the present invention provides a process for the continuous production of an elongate rod-shaped comminuted meat product which comprises feeding a flowable protein-containing food mixture into a hollow mould which travels through a microwave oven and which is formed by the co-operation of the adjacent runs of a pair of endless flexible belts which have a sealing system and afterwards releasing the meat product from the sealing system characterised in that the sealing system comprises, on each side of the hollow mould, at least one longitudinal projection on one belt engaging with at least one corresponding recess on the other belt. Conveniently, one belt is provided with all the projections and the other belt with the corresponding recesses but it is possible for each belt to be provided with both projections and recesses. The projections advantageously have substantially U- or V-shaped cross-section.

The process of the present invention is particularly suitable for the production of skinless sausages, especially Vienna sausages and frankfurters, in which case the flowable protein-containing food mixture is conveniently sausage mince. In the production of Vienna sausages a continuous stream of sausage mince is fed into the hollow mould and after leaving the microwave oven the coagulated strand is cut into individual sausages. In the production of frankfurters sausage mince and shaped plugs are alternately fed into the hollow mould whereby the shaped plugs maintain the frankfurters spaced apart while imparting the characteristic rounded shape to the ends.

The hollow mould which is formed by the co-operation of the adjacent runs of the two belts conveniently has a circular cross-section so that it is cylindrical in shape. If desired, there may be more than one pair of belts each pair co-operating to form a hollow mould, so that a plurality of moulds travel through the microwave oven, preferably parallel to one another.

Conveniently, the hollow mould is formed by the belts co-operating one above the other and, in a preferred embodiment, there is a longitudinal ridge or groove on each side of the lower belt beyond the sealing means so that any excess protein-containing food mixture that escapes from the cavity of the mould is trapped and carried out of the microwave oven on the moving belt thus preventing the risk of fire caused by food remaining in the microwave oven.

The belt material preferably has a very low dielectric constant which absorbs relatively little or no microwave energy and may advantageously be a synthetic rubber such as Isoprene rubber or an Indian rubber compound made of ethylene-propylene-diene material (EPDM). The microwave oven is preferably a microwave tunnel composed of a pair of surface wave-guide applicators facing each other at a certain distance thus constituting a double-sided microwave field between the wave-guide applicators, e.g. a Scan-Pro microwave tunnel as described in Swiss Pat. No. 498,546.

At the discharge end of the microwave oven the co-operating belts which form the hollow mould disengage and open up longitudinally so releasing the meat product which is transferred, for instance, by a pick-up device to a conventional belt which may be made of ordinary transport material such as metal or rubber. In the preparation of frankfurters, means are provided for separating the shaped plugs from the frankfurters after release from the hollow mould. After the meat product has been released the belts that have disengaged are advantageously cleaned, for example, by spraying with water at high pressure, followed by drying, conveniently with compressed air. In addition the surfaces of the belts which form the cavity of the hollow mould are desirably sprayed with a dilute acetic acid solution.

The temperature of the meat product at the discharge end of the microwave oven is preferably from 60° to 75° C. and especially from 65° to 70° C. Advantageously, the product is maintained at the discharge temperature for a short period of time after discharge, conveniently by being conveyed to a steam chamber and held there, for example from 1 to 10 minutes and preferably from 2 to 5 minutes. If the belt passing through the steam chamber is made of rubber it should be able to withstand temperatures of at least 80° C.

Afterwards the product may be conveyed by a feeding belt to a canning machine. A suitable canning machine for Vienna sausages is one manufactured by the Marlen Company, Kansas, U.S.A.

When Vienna sausages are prepared by this process the strands may be automatically cut to the appropriate lengths in the canning machine, for instance, by a knife or by jet cutting, but if desired, the strands may be pre-cut to shorter lengths, conveniently from 20 to 30 inches at an earlier stage, for instance, after treatment in the steam chamber before cutting them to their final lengths in the canning machine.

Advantageously, there may be an accumulation conveyor system situated immediately before the feeding belt to the canning machine, which can automatically accumulate the strands of the meat product during any short interruption of the canning machine which may occur.

An example of a suitable accumulation conveyor system comprises an upper and lower fixed conveyor each having an endless belt characterised in that both belts travel in the same direction and that a mobile conveyor capable of moving longitudinally to and from a position between the fixed conveyors has an endless belt which travels in the opposite direction to the belts of the fixed conveyors.

When in motion, the upper runs of the belts of the fixed conveyors travel in the direction of the sausage strands from the microwave oven to the canning machine. When the mobile conveyor moves from its position between the fixed conveyors, it travels in the same direction as the upper runs of the belts of the fixed conveyors, preferably to a position where substantially all of it has emerged from between the fixed conveyors. In this position, normal operations can be carried out where sausage strands are transported on the upper run of the upper belt and pass around the adjacent end of the mobile conveyor and on to the feeding belt to the canning machine. If the canning machine stops for any reason, the lower belt and the feeding belt stop as well, and the mobile conveyor starts to move back to its position between the fixed conveyors thus accumulating the sausage strands on the belt of the mobile conveyor and on the belt of the lower fixed conveyor. The total length of this accumulation conveyor system will determine the maximum time at which it will be possible to accumulate the sausage strands while the canning machine is stopped and if the canning machine stops for longer than this maximum time, the entire processing line stops automatically. When the canning machine restarts all the conveyor belts restart as well and the mobile conveyor starts to move from its position between the fixed conveyors and the sausage strands are transported on the feeding belt to the canning machine.

The present invention thus enables the mechanisation of the complete process to be carried out continuously from the initial feeding of the flowable protein-containing food mixture into the hollow mould to the final canning.

The present invention will now be further described by way of Example with reference to the accompanying drawings in which:

FIG. 1 is a diagrammatic side view, partly in section showing the operation of a pair of endless belts which pass through a microwave tunnel.

FIGS. 2 and 3 are transverse sections of a pair of endless belts in co-operation to show two different possible profiles.

FIG. 4 is a side sectional view of a steam chamber.

FIGS. 5 and 6 are side sectional views of an accumulation conveyor system showing it in two different positions.

Referring to the drawings, two endless isoprene rubber belts 1 and 2 are each trained about a pair of rollers 3 at the inlet end of a Scan-Pro microwave tunnel 4. Inside the microwave tunnel 4, a hollow mould 5 is formed by the co-operation of the lower run of belt 1 and the upper run of belt 2 by means of longitudinal projections 6 on belt 1 engaging in corresponding recesses 7 in belt 2. Belt 2 is also provided with a pair of longitudinal ridges 8 as shown in FIG. 3. Sausage mince 9 from a Handtmann feeding unit (not shown) is extruded into the hollow mould 5 by an injection nozzle 10. At the discharge end of the microwave tunnel 4 the belts 1 and 2 disengage and open up longitudinally as they are trained about a pair of rollers 11 and the coagulated sausage strand 12 is thus released where it is transferred to a conventional rubber conveyor belt 13 by means of a pick-up device 14. Meanwhile, the upper run of belt 1 and the lower run of belt 2 travel through belt washing devices 15 and 16 in which they are sprayed with water at high pressure and afterwards dried with compressed air. Before being trained about the rollers 3 the belts are sprayed with dilute acetic acid by means of sprays 17 and 18.

The sausage strand 12 is transported through a vessel 19 containing a mixture of dilute acetic acid and smoke flavour essence and then to a steam chamber 20 where it is transported in the direction shown by the arrows on belts 21 trained about rollers 22 for 4 minutes to maintain the temperature at 70° C.

Afterwards the sausage strand 12 is first transported to an accumulation conveyor system 23 comprising fixed conveyors 24 and 25 having endless belts 26 and 27 trained about rollers 28 and 29 respectively, and a mobile conveyor 30 having an endless belt 31 trained about rollers 32, and then to a canning machine (not shown) on a feeding belt 33 trained about rollers 34. The direction of motion of the belts 26 and 27 is such that their upper runs travel in the direction of the sausage strands towards the canning machine while belt 31 travels in the opposite direction.

In normal operating conditions the mobile conveyor 30 is in the position shown in FIG. 5 and the sausage strand travels in the direction shown by the arrows on the upper run of belt 26 then passes around the end of the mobile conveyor 30 which is adjacent to the fixed conveyors 24 and 25, and on to the feeding belt 33 where it is transported to the canning machine. If the canning machine stops for any reason, the lower fixed conveyor belt 27 and the feeding belt 33 stop as well, and the mobile conveyor 30 starts to move in between the two fixed conveyors 24 and 25 at a suitable speed until it reaches the position shown in FIG. 6 causing the sausage strand 12 to travel in the direction shown by the arrows so that it lies on the upper run of the belt 31 of the mobile conveyor 30 and on the upper run of the belt 27 of the lower fixed conveyor 25. When the canning machine restarts the conveyor belts 26, 27 and 31 and the feeding belt 33 restart as well, and the mobile conveyor 30 starts to move slowly to its position shown in FIG. 5 so that the sausage strand is again transported on the feeding belt 33 to the canning machine.

I claim:

1. A process for the continuous production of an elongated rod-shaped comminuted meat product which comprises:
   (a) feeding a flowable protein-containing food mixture into a hollow mold which is formed by the cooperation of the adjacent runs of a pair of endless flexible belts and which mold has a sealing system formed by at least one longitudinal projection on one of the flexible belts which is engaged with at least one corresponding recess on the other of the flexible belts;
   (b) passing the mold containing the food mixture through a microwave oven; and then
   (c) releasing the meat product from the said mold.

2. A process according to claim 1, wherein the longitudinal projections have substantially U- or V-shaped cross-sections.

3. A process according to claim 1, wherein the rod-shaped comminuted meat product is a skinless Vienna sausage.

4. A process according to claim 1, wherein the rod-shaped comminuted meat product is a frankfurter.

5. A process according to claim 1, wherein the hollow mould has a circular cross-section.

6. A process according to claim 1, wherein the hollow mould is formed by the belts co-operating one above the other and that there is a longitudinal ridge or groove on each side of the lower belt beyond the sealing means.

7. A process according to claim 1, wherein the endless flexible belts are made of isoprene rubber or an Indian rubber compound composed of ethylene-propylene-diene material.

8. A process according to claim 1, wherein the microwave oven is a microwave tunnel composed of a pair of surface wave-guide applicators facing each other at a certain distance thus constituting a double-sided microwave field between the wave-guide applicators.

9. A process according to claim 1, wherein after releasing the meat product from the hollow mould, the meat product is maintained at a temperature of 60° to 75° C. for a period of from 1 to 10 minutes.

10. A process according to claim 1 wherein there is situated after the microwave oven but immediately before a feeding belt leading to a canning machine an accumulation conveyor system which comprises an upper and lower fixed conveyor each having an endless belt wherein both belts travel in the same direction and that a mobile conveyor capable of moving longitudinally to and from a position between the fixed conveyors has an endless belt which travels in the opposite direction to the belts of the fixed conveyors.

11. A process according to claim 3, wherein the Vienna sausage is cut to its final size by jet cutting.

12. A process for the continuous production of an elongated rod-shaped comminuted meat product which comprises:
   (a) feeding a flowable protein-containing food mixture into a hollow mold having a cavity wall free of surface irregularities which is formed by the cooperation of the adjacent runs of a pair of endless flexible belts and which mold has a sealing system formed by at least one longitudinal projection on one of the flexible belts which is engaged with at least one corresponding recess on the other of the flexible belts;
   (b) passing the mold containing the food mixture through a microwave oven; and then
   (c) releasing the elongated rod-shaped comminuted meat product having a substantially smooth surface from the said mold.

* * * * *

UNITED STATES PATENT AND TRADEMARK OFFICE
CERTIFICATE OF CORRECTION

PATENT NO. : 4,448,793
DATED : May 15, 1984
INVENTOR(S) : Yngve R. Akesson

It is certified that error appears in the above—identified patent and that said Letters Patent is hereby corrected as shown below:

On the title page, under subheading "Foreign Application Priority Data", Swedish Application No. "8105623", should read -- 81056236 --.

Column 1, line 11, after "discarded", the comma should be a period.

Column 1, line 34, before "microwave", insert -- a --.

Signed and Sealed this

Nineteenth Day of February 1985

[SEAL]

Attest:

DONALD J. QUIGG

Attesting Officer      Acting Commissioner of Patents and Trademarks